UNITED STATES PATENT OFFICE 1,936,864

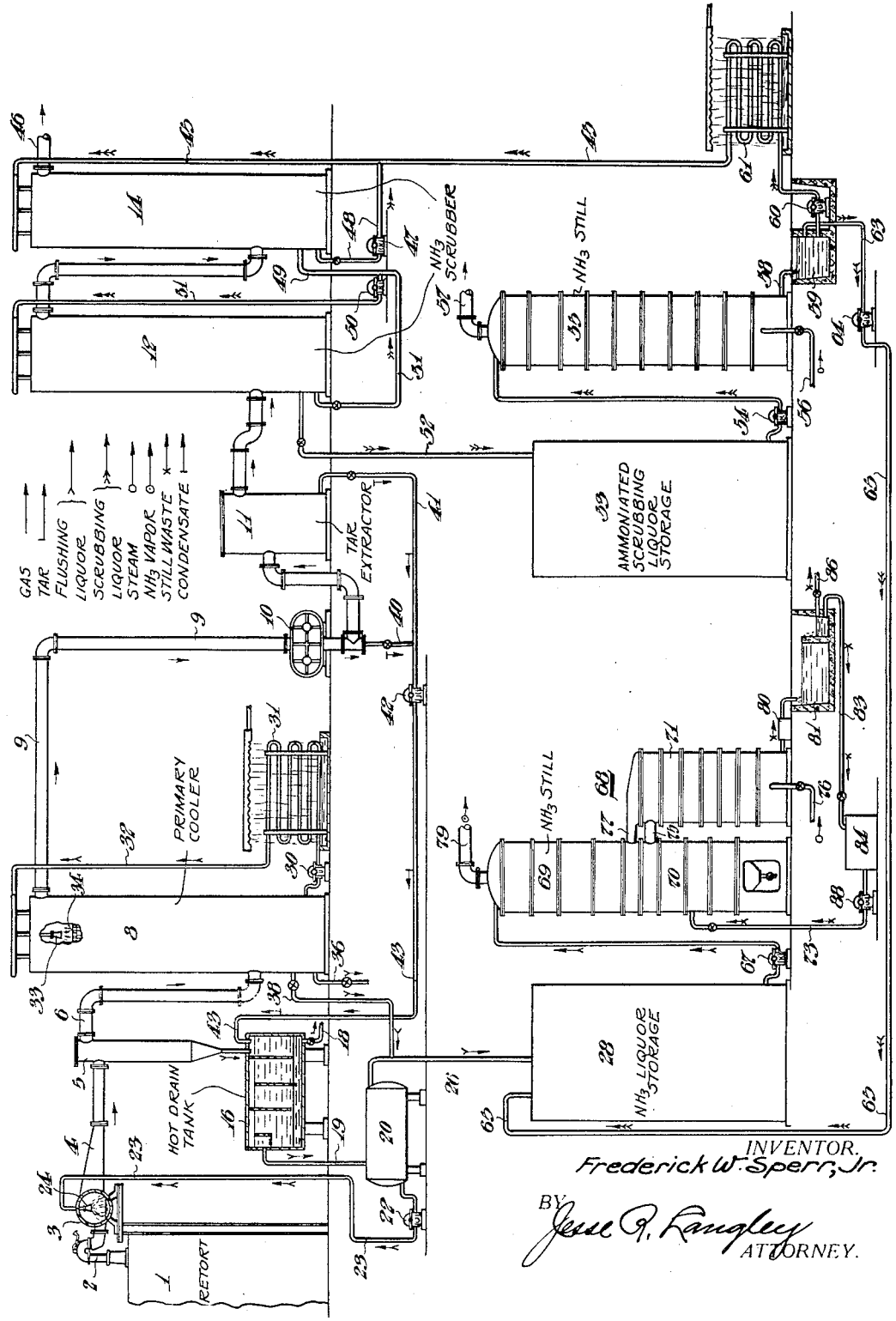

AMMONIA RECOVERY

Frederick W. Sperr, Jr., Ventnor, N. J., assignor to The Koppers Company of Delaware, a corporation of Delaware Application February 23, 1932. Serial No. 594,455

2 Claims. (Cl. 23—196)

My invention relates to the recovery of ammonia from fuel gases such as coke oven gas, mixed gas, and the like. It relates especially to the recovery of ammonia by the so-called indirect process in the form of ammonia liquor.

At gas manufacturing plants such as coke oven plants where the major portion of the ammonia content of the gas is recovered directly in the form of ammonium sulphate by contacting the gas with sulphuric acid, the production of ammoniacal gas liquor ordinarily amounts to about 20 gallons per ton of coal carbonized. This liquor is produced by cooling and condensing the crude gas and contains most of the fixed ammonium compounds produced during carbonization as well as some free ammonia. The major portion of the free ammonia remains in the gas and is subsequently removed as ammonium sulphate.

At some plants, however, all of the ammonia is removed from the gas in the form of liquor and the quantity of liquor produced is then about three and a half or four times as great as in plants where ammonium sulphate is produced, amounting to 80 gallons per ton of coal carbonized, for example. Of this amount, about 20 gallons is condensing liquor as in the previous case, and the remaining 60 gallons come from the ammonia scrubbers where the ammonia is washed from the gas with water. The ammonia contained in this scrubber liquor is principally in the free form.

In the past it has been common practice at ammonia liquor plants to combine the condensing liquor and the scrubber liquor before treating for recovery of ammonia. The combined liquor was then delivered to an ammonia recovery installation consisting usually of a free ammonia still, a lime mixing chamber and a fixed ammonia still. The liquor was treated in the free still for removal of free ammonia, mixed with milk of lime or other suitable alkaline material to liberate fixed ammonia, and then further distilled with steam in the fixed still to remove the remaining ammonia.

In treating ammonia liquor in this manner the volume of the liquor is increased about 40% to 50%, due to condensation of steam supplied for distillation and to the addition of milk of lime or analogous alkaline liquids. Consequently at ammonia liquor plants still waste production frequently amounts to from 100 to 120 gallons per ton of coal carbonized. In many instances the disposal of such large quantities of still waste presents a serious problem, as it is generally necessary to provide settling basins or other suitable means for clarifying the waste before its discharge to streams, and purification from constituents other than suspended solids, such as tar acids, is also frequently required.

An object of my present invention is to provide a process whereby the amount of still waste produced at ammonia liquor plants is materially reduced.

Another object of my invention is to provide an improved process of recovering ammonia from fuel gases and suitable apparatus therefor.

My invention has for further objects such other operative advantages and results as obtain in the process and apparatus hereinafter described and claimed.

By means of my invention the difficulties ordinarily encountered in disposing of the large quantities of ammonia still waste produced in ammonia liquor plants are avoided in an efficient and economical manner, and I have found that the amount of still waste produced in these plants can be so reduced that it does not materially exceed the amount produced at plants where ammonia is recovered in the form of sulphate.

To accomplish these desirable results I collect the aqueous condensate or condensing liquor from the collecting main, primary cooler or coolers, the exhauster and tar extractor, etc., in a separate system and distill it in the usual type of ammonia still to recover free and fixed ammonia. This system removes substantially all of the fixed ammonia from the gas. I prefer to use no fresh water in making up milk of lime for this still but instead I use a portion of the still waste for this purpose, preferably after clarification.

Ammonia liquor from the scrubbers is collected in a second system and distilled preferably in a single column ammonia still, without liming, to recover free ammonia. Effluent from this still is cooled and recirculated through the scrubbers to treat a further quantity of gas. This liquor is diluted somewhat by condensation of steam during distillation and by condensation of water vapor from the gas, and excess liquor thereby produced is transferred to the first system and distilled with the condensing liquor.

I now describe with reference to the accompanying drawing a preferred method of practicing my improved process of recovering ammonia from fuel gases. In the drawing The single figure is a partially diagrammatic elevational view, with sections broken away, of apparatus suitable for the practice of my present invention.

Gas is produced in a coke oven or retort, which is usually one of a battery of similar ovens or retorts, and passes from the oven through an ascension pipe 2 into a hydraulic main or collecting main 3. In this main it is contacted with flushing liquor which cools the gas and condenses therefrom certain constituents such as tar and fixed ammonia. The gas then passes with the flushing liquor and condensate through an off-take pipe 4 into a pitch trap 5. In the pitch trap 5 the gas is separated from the liquids present, and passes from the upper portion of the trap through a pipe 6 into a primary cooler 8.

In the cooler 8 the gas is further cooled and condensed by contact with cooling liquor, which is preferably recirculated, and the cooled gas passes from the cooler through a pipe 9, an exhauster 10 and a tar extractor 11 to the ammonia scrubbers. These scrubbers may be of any suitable type, such as horizontal rotary scrubbers, or vertical scrubbers packed with suitable contact material, or scrubbers of the bubble tray type, for example.

In the present instance vertical scrubbers 12 and 14 packed with suitable contact material are used. Scrubbing liquor, which is preferably cooled to the lowest temperature feasible, is passed over the scrubbers in series in countercurrent with the flow of gas, from which it absorbs ammonia. It is to be understood that if desired any other type of scrubber may be used or a different number of scrubbers of this type may be used.

Flushing liquor and condensate from the gas pass from the bottom of the pitch trap 5 into a hot drain tank 16. In this tank the aqueous ammoniacal liquor or gas liquor is separated from tar, and the tar may be withdrawn through a pipe 18 for any desired disposal. Gas liquor substantially free from tar passes from the hot drain tank through a pipe 19 into a flushing liquor circulating tank 20, from which it is withdrawn by a pump 22 and recirculated through a pipe 23, which may terminate in sprays 24 or other suitable distributing devices, into the collecting main 3, to cool a further quantity of gas.

Excess flushing liquor, substantially equal in amount to the aqueous condensate formed from the gas in the collecting main, overflows from the tank 20 through a pipe 26 into an ammonia liquor storage tank 28.

Cooling liquor after passing downward through the primary cooler 8 in contact with the gas, which it cools and from which it condenses a further quantity of tar and ammoniacal liquor, collects in a sump or well in or near the bottom of the primary cooler. From this well it is withdrawn by a pump 30 and recirculated through a cooler 31, a pipe 32, and sprays 33 or other suitable distributing devices, onto the contact material 34 which may consist of wooden hurdles or other suitable contacting means. It passes downwardly over this contact material in intimate contact with a further quantity of gas which is thereby cooled.

Tar or other heavy material settles to the bottom of the sump and may be withdrawn through a pipe 36. Excess liquor produced by condensation from the gas overflows through a pipe 38, through which it passes into pipe 26 and thence to the ammonia liquor storage tank 28.

Further condensation of tar and/or ammoniacal liquor usually takes place in the exhauster 10 and the tar extractor 11. Condensate formed at these points passes through pipes 40 and 41 to a pump 42, or other suitable means of delivery, which transfers it through pipe 43 to the hot drain tank 16 where tar and ammonia liquor are separated and separately withdrawn through pipes 18 and 19.

Cooled scrubbing liquor is delivered through a pipe 45 to the last ammonia scrubber 14 of the series of scrubbers, in which it removes ammonia remaining in the gas with which it comes in contact. Gas substantially free from ammonia passes from the scrubber 14 through a pipe 46. The liquor is preferably recirculated from the bottom of the scrubber 14 by pump 47 through pipes 48 and 45.

Excess liquor overflows through a pipe 49 to a pump 50 which delivers it to the preceding scrubber 12, in which it removes at least a part of the ammonia from a further quantity of gas. In the present instance, the scrubber 12 is the first of the series of two scrubbers, but any other desired number of scrubbers may be employed, through which the gas and liquor pass countercurrently in series.

The ammoniacal scrubber liquor may be recirculated over the scrubber 12 through a pipe 51 and the pump 50. Liquor overflows and passes from the scrubber through a pipe 52 to an ammoniated scrubbing liquor storage tank 53. From this tank it is withdrawn by a pump 54, which delivers it to a single column ammonia still 55 where the scrubbing liquor is distilled with steam supplied through a pipe 56. Ammonia is thereby removed, and passes from the top of the still through a vapor outlet 57 for condensation or utilization.

Stripped scrubbing liquor passes from the bottom of the still 55 through a pipe 58 into a sump or trench 59 or other suitable collecting means. From this trench liquor is withdrawn by a pump 60, and delivered through a cooler 61 and pipe 45 to the scrubbing system.

Excess liquor, produced by condensation in the still 55 or in the scrubbers, overflows from the trench 59 through a pipe 63 and is delivered by a pump 64 through a pipe 65 to the ammonia liquor storage tank 28 in the condensing liquor system. Alternatively, this liquor may be delivered to some other part of the condensing system, as to the circulating tank 20, for example.

Liquor is withdrawn from the storage tank 28 by a pump 67 and delivered to an ammonia recovery installation 68 which preferably consists of a free still 69 mounted upon a liming chamber 70 and connected with a fixed still 71 in the usual manner. Liquor is delivered by the pump 67 to the top of the free still 69 and passes downwardly through this still in countercurrent with steam or other hot vapor which removes free ammonia and other volatile constituents from the liquor.

The liquor then continues downward into the lime mixing chamber 70 where it is mixed with milk of lime or other suitable alkaline solution or suspension supplied through a pipe 73. This lime liberates the fixed ammonia and the liquor, usually containing some excess lime in suspension, flows from the liming chamber through a pipe 75 into the fixed still 71. In this still the liquor is subjected to further distillation with steam supplied through a pipe 76 which removes the originally fixed ammonia and any other ammonia remaining in the liquor.

Vapor passes from the top of this fixed still 71 through a pipe 77 into the bottom of the free still, through which it continues upwardly, removing free ammonia from a further quantity of liquor. Vapors pass from the top of the free still 69 through a vapor pipe 79 for condensation or other disposal. Still waste substantially free from ammonia passes from the bottom of the fixed still 71, preferably through a trap 80 to a settling basin 81 or other suitable means of clarifying the waste by removal of suspended solids.

A portion of the clarified waste is withdrawn through a pipe 83 to a lime mixing tank 84, and the remainder of the still waste is discharged through a pipe 86 for any desired disposal. In the tank 84 clarified still waste is mixed with lime to form lime suspension or milk of lime which is delivered by a pump 88 through the pipe 73 to the liming chamber 70, where it liberates fixed ammonia contained in a further quantity of liquor.

By the simple procedure described hereinabove I have found it possible to reduce the still waste production at ammonia liquor plants to substantially the amount produced at sulphate plants without appreciably adding to the cost of ammonia recovery.

A further advantage inherent in my present process is that when dephenolization of the ammonia liquor is necessary, which is now frequently the case, the amount of liquor to be dephenolized is greatly reduced. Dephenolization may be effected in connection with the present process by scrubbing the liquor withdrawn from tank 28 with an immiscible solvent prior to its introduction into the ammonia stills, or by dephenolizing the liquor after passing through the free ammonia still 69 but before entering the liming chamber 70.

In the latter instance dephenolization may be effected by contacting the liquor with steam or other suitable hot gas or vapor, as described in the copending applications of J. A. Shaw, Serial No. 230,570, filed November 2, 1927, and of M. Shoeld, Serial No. 386,515, filed August 17, 1929, for example.

It will be obvious to those skilled in the art that various modifications can be made in the several steps of my process and the several parts of my apparatus without departing from the spirit of my invention and it is my intention to cover in the claims such modifications as are included within the scope thereof.

I claim as my invention:

1. The process of recovering ammonia from fuel gas, which comprises cooling the gas and condensing therefrom ammoniacal liquor and tar, then scrubbing the gas with an aqueous liquid which removes a further quantity of ammonia and is thereby ammoniated, separating condensed ammoniacal liquor from tar, recirculating at least a part of the separated ammoniacal liquor to cool a further quantity of gas, withdrawing excess liquor from the cooling system, separately collecting the ammoniated scrubbing liquor and distilling it to remove free ammonia therefrom, cooling the distilled liquor and recirculating it to scrub ammonia from a further quantity of gas, withdrawing excess liquor from the scrubbing system and combining it with the excess liquor withdrawn from the condensing system, and treating the combined excess liquor to remove free and fixed ammonia therefrom.

2. The process of recovering ammonia from fuel gas, which comprises cooling the gas and condensing therefrom ammoniacal liquor and tar, then scrubbing the gas with an aqueous liquid which removes a further quantity of ammonia and is thereby ammoniated, separating condensed ammoniacal liquor from tar, recirculating at least a part of the separated ammoniacal liquor to cool a further quantity of gas, withdrawing excess liquor from the cooling system, separately collecting the ammoniated scrubbing liquor and distilling it to remove free ammonia therefrom, cooling the distilled liquor and recirculating it to scrub ammonia from a further quantity of gas, withdrawing excess liquor from the scrubbing system and combining it with the excess liquor withdrawn from the condensing system, distilling the combined excess liquor with lime to remove free and fixed ammonia therefrom, discharging still waste thereby produced, clarifying the still waste, adding lime to clarified still waste to form a suspension, and adding the lime suspension to a further quantity of ammoniacal liquor to liberate fixed ammonia contained therein.

FREDERICK W. SPERR, JR.